United States Patent
Hanson et al.

(10) Patent No.: US 11,177,997 B2
(45) Date of Patent: Nov. 16, 2021

(54) DISTRIBUTED ANTENNA SYSTEM TRANSPORT LINK QUALITY MEASUREMENT

(71) Applicant: CommScope Technologies LLC, Hickory, NC (US)

(72) Inventors: Van E. Hanson, Forest, VA (US); Michael J. Williamson, Clayton, NC (US)

(73) Assignee: CommScope Technologies LLC, Hickory, NC (US)

( * ) Notice: Subject to any disclaimer, the term of this patent is extended or adjusted under 35 U.S.C. 154(b) by 106 days.

(21) Appl. No.: 14/456,709

(22) Filed: Aug. 11, 2014

(65) Prior Publication Data

US 2015/0244562 A1    Aug. 27, 2015

Related U.S. Application Data

(60) Provisional application No. 61/942,686, filed on Feb. 21, 2014.

(51) Int. Cl.
| | |
|---|---|
| H04L 12/24 | (2006.01) |
| H04B 17/17 | (2015.01) |
| H04B 17/29 | (2015.01) |
| H04L 12/26 | (2006.01) |
| H04W 24/04 | (2009.01) |

(52) U.S. Cl.
CPC ............. *H04L 41/06* (2013.01); *H04B 17/17* (2015.01); *H04B 17/29* (2015.01); *H04L 43/08* (2013.01); *H04W 24/04* (2013.01)

(58) Field of Classification Search
CPC ......... H04L 41/06; H04L 43/08; H04L 12/24; H04B 17/29; H04B 17/17; H04B 17/336; H04W 24/04
See application file for complete search history.

(56) References Cited

U.S. PATENT DOCUMENTS

| | | | | |
|---|---|---|---|---|
| 5,751,152 A | * | 5/1998 | DuBose | ................ H04B 3/487 |
| | | | | 324/628 |
| 6,272,150 B1 | * | 8/2001 | Hrastar | ................ H04H 20/79 |
| | | | | 370/254 |
| 7,224,170 B2 | | 5/2007 | Graham et al. | |
| 7,239,886 B2 | | 7/2007 | Gross et al. | |

(Continued)

OTHER PUBLICATIONS

International Patent Application No. PCT/US2014/050557, International Search Report and Written Opinion, dated Nov. 24, 2014, 11 pages.

(Continued)

*Primary Examiner* — Ajit Patel
*Assistant Examiner* — Richard Schnell
(74) *Attorney, Agent, or Firm* — Fogg & Powers LLC (57) ABSTRACT

The present disclosure relates to transport link quality measurement in a distributed antenna system. A link quality indicator associated with the functional performance of a digital transport link in the distributed antenna system can be determined by a component of the distributed antenna system. An indication of a potential fault condition can be determined based on the link quality indicator before a fault condition associated with the potential fault condition occurs. The indication of the potential fault condition can be presented, for example, via a graphical user interface, a table, or an email alert.

20 Claims, 7 Drawing Sheets

(56) References Cited

U.S. PATENT DOCUMENTS

| | | | |
|---|---|---|---|
| 7,321,846 B1* | 1/2008 | Huisenga | H04L 1/24 |
| | | | 702/183 |
| 7,386,306 B2 | 6/2008 | Laroia et al. | |
| 7,561,797 B1* | 7/2009 | Harley | H04B 10/0793 |
| | | | 398/159 |
| 7,869,828 B2 | 1/2011 | Wang et al. | |
| 7,961,689 B2 | 6/2011 | Stratford | |
| 8,145,127 B2 | 3/2012 | Nory et al. | |
| 2003/0114165 A1 | 6/2003 | Mills | |
| 2004/0142699 A1 | 7/2004 | Jollota et al. | |
| 2006/0099912 A1 | 5/2006 | Binzel et al. | |
| 2006/0145884 A1 | 7/2006 | Graham et al. | |
| 2006/0161213 A1* | 7/2006 | Patel | A61N 1/37282 |
| | | | 607/30 |
| 2007/0264009 A1* | 11/2007 | Sabat, Jr. | H04B 10/1127 |
| | | | 398/5 |
| 2008/0265915 A1* | 10/2008 | Clark | G01R 27/04 |
| | | | 324/699 |
| 2008/0266127 A1 | 10/2008 | Bajpay et al. | |
| 2010/0190519 A1 | 7/2010 | Zavadsky et al. | |
| 2012/0134673 A1* | 5/2012 | Palanisamy | H04B 10/25754 |
| | | | 398/58 |
| 2013/0017863 A1 | 1/2013 | Kummetz et al. | |
| 2013/0071112 A1 | 3/2013 | Melester et al. | |
| 2013/0286864 A1* | 10/2013 | Karam | G01R 19/16566 |
| | | | 370/252 |
| 2013/0337750 A1 | 12/2013 | Ko | |
| 2016/0269916 A1* | 9/2016 | Varga | H04W 24/02 |

OTHER PUBLICATIONS

European Patent Office, "Extended European Search Report for EP Application 14882859.3", "Foreign Counterpart to U.S. Appl. No. 14/456,709", dated Aug. 18, 2017, pp. 1-9, Published in: EP.

Australian Government IP Australia, "Examination Report No. 1 for Standard Patent Application for AU Application No. 2014383055", "from Foreign Counterpart U.S. Appl. No. 14/456,709", dated May 17, 2018, pp. 1-3. Published in: AU.

European Patent Office, "Communication pursuant to Article 94(3) EPC for EP Application No. 14882859.3", "from Foreign Counterpart to U.S. Appl. No. 14/456,709", dated May 2, 2018, pp. 1-6, Published in: EP.

European Patent Office, "Communication pursuant to Article 94(3) from EP Application No. 14882859.3", from Foreign Counterpart to U.S. Appl. No. 14/456,709, dated Oct. 10, 2019, pp. 1-6, Published: EP.

European Patent Office, "Communication pursuant to Article 94(3) EPC from EP Application No. 14882859.3", from Foreign Counterpart to U.S. Appl. No. 14/456,709, dated Sep. 7, 2020, p. 1 through 7, Published: EP.

Commscope, "ION—M Series", Andrew Solutions, Feb. 2013, pp. 1 through 8.

Commscope, "i-POI Intelligent Point of Interface", Apr. 2012, pp. 1 through 8.

* cited by examiner

| LINK | LENGTH (m) | ATTENUATION (dB) | RESISTANCE (ohm) | BER | FAULT CONDITION STATUS INDICATOR |
|---|---|---|---|---|---|
| HEU-RU1 | 60 | 18 | 3 | 0 | GREEN |
| HEU-RU2 | 60 | 19 | 3 | 0 | GREEN |
| HEU-EU | 70 | 17 | 4 | 0 | GREEN |
| EU-RU3 | 30 | 22 | 3 | 5E-16 | AMBER |
| EU-RU4 | 70 | 24 | 5 | 3E-10 | RED |
| EU-RU5 | 60 | 19 | 4 | 0 | GREEN |
| EU-RU6 | 50 | 22 | 3 | 0 | AMBER |

DISTRIBUTED ANTENNA SYSTEM TRANSPORT LINK QUALITY MEASUREMENT

CROSS-REFERENCE TO RELATED APPLICATIONS

This claims priority to U.S. Provisional Application Ser. No. 61/942,686, filed Feb. 21, 2014 and titled "Distributed Antenna System Transport Link Quality Measurement," the contents of which are incorporated herein by reference.

BACKGROUND

A distributed antenna system (DAS) includes a network of spatially separated antenna nodes connected to a common source via a transport medium. A DAS provides wireless service within a geographic area or structure. A DAS can communicate signals between a base station and mobile communication devices via, for example, a head-end unit and one or more remote units. The head-end unit can communicate signals between the base station and the remote units. The remote units can communicate signals between the head-end unit and user mobile devices using antennas. Examples of suitable communications links used for connecting components in the DAS can include copper transport links (e.g., Ethernet cable) and optical fiber.

Predicting a failure of a digital communications link in a DAS before a failure occurs can be difficult, if not impossible. Instead, a failure is detected only after the failure has occurred by, for example, sending or receiving special messages (e.g., heartbeat or acknowledgment messages) over the link. If no message is received, the link can be determined to have failed. Waiting until after a failure occurs, however, can be expensive and disruptive to wireless service provided by the DAS.

SUMMARY

The present disclosure relates to methods and systems for transport link quality measurement in a distributed antenna system. One method includes determining, by a component of a distributed antenna system, a link quality indicator associated with the functional performance of a digital transport link in the distributed antenna system. An indication of a potential fault condition can be determined based on the link quality indicator before a fault condition associated with the potential fault condition occurs.

A system for transport link quality measurement in a distributed antenna system is also disclosed. The system can include a measurement module configured to determine a link quality indicator associated with the functional performance of a digital transport link in the distributed antenna system. A diagnostic module is configured to determine, based on the link quality indicator, an indication of a potential fault condition before a fault condition associated with the potential fault condition occurs.

DETAILED DESCRIPTION

Certain aspects and features of the present disclosure relate to transport link quality measurement in a distributed antenna system (DAS). A link quality indicator can include a parameter, attribute, metric, or other characteristic associated with or indicative of a functional aspect of performance of a transport link in a telecommunications system, such as a DAS. Various indicators of link quality or integrity can be determined, for example, by measuring or monitoring parameters in the DAS. The link quality indicators can be collected by monitoring software or hardware located at components in the DAS, such as remote units, expansion units, and head-end units. Link quality indicators can also be determined over a period of time to provide for determining a change in the link quality indicator over the period of time. The indicators can be sent to a diagnostic module for determining whether a potential fault condition is indicated. The diagnostic module can include software or hardware located at one or more components (e.g., at a head-end unit) in the DAS. The indication of a potential fault condition can be presented to a user by a presentation module. For example, the presentation module can generate an alert or alarm that can be sent to the user. Alternatively, link quality indicators and the indication(s) of potential fault conditions can be displayed in a graphical format, such as a table or network diagram. Determining an indication of a potential fault condition can allow detection of impairments, soft failures, or pre-failures of the quality or integrity of a component in the DAS before a hard failure condition occurs. Detecting potential fault conditions in the DAS before the fault condition occurs can allow system administrators to perform adjustments to the DAS to prevent the fault condition from occurring.

A communications failure that has not yet occurred can be referred to as a "potential fault condition" or a "soft failure." A soft failure can include a degradation of a communications link to operate outside of a normal operating range. The degradation of the communications link can be measured by measuring an attribute, metric, parameter, or other characteristic of the link. A normal operating range can include a range of parameters in which the communications link is functioning at its full, expected, normal performance or quality. An acceptable operating range can include a range of parameters in which the communications link is functional but degraded in performance or quality. In contrast to a soft failure, a hard failure can include a condition in which the communications link does not operate at all.

Figure 1:
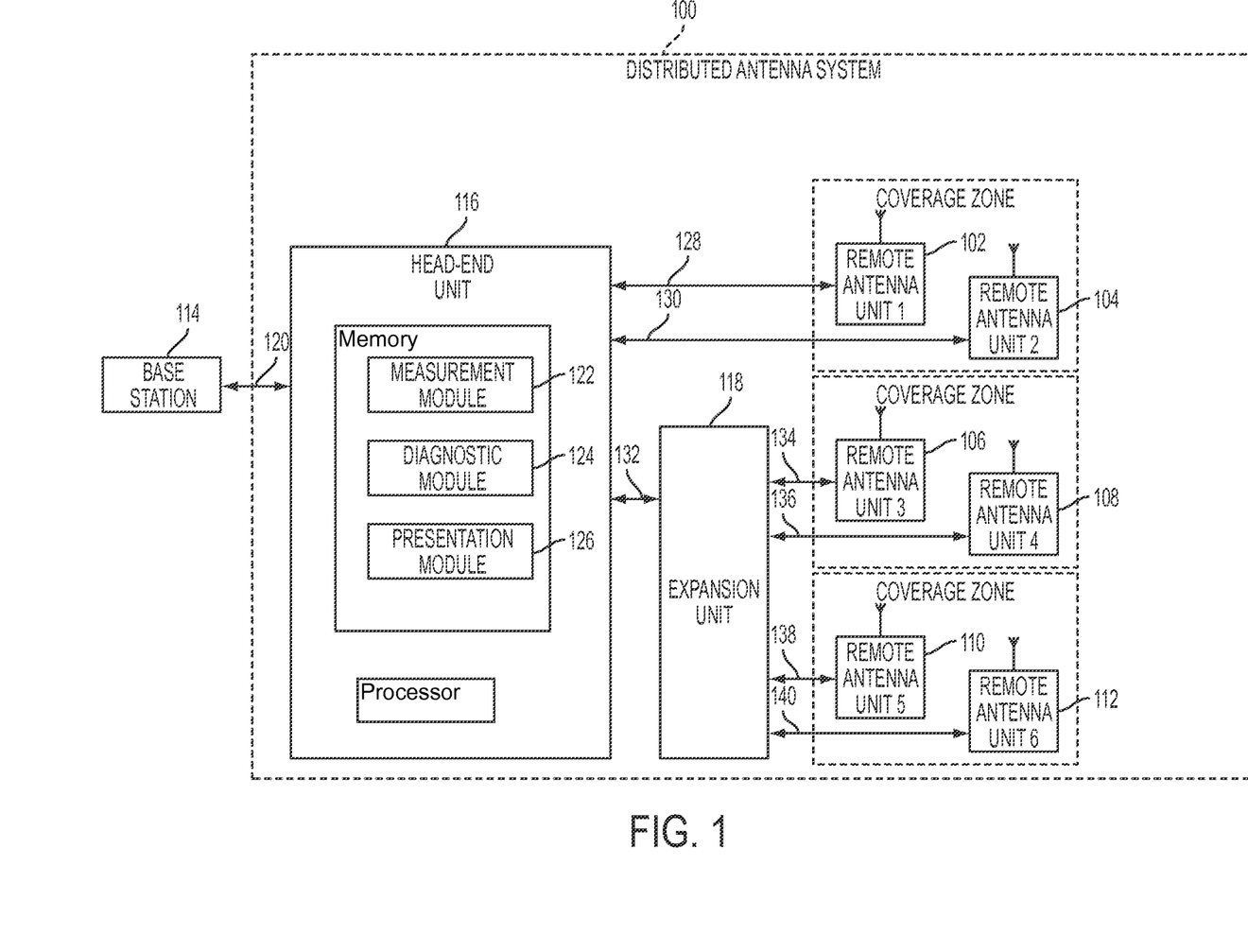
FIG. 1 is a functional block diagram of a distributed antenna system (DAS) suitable for detecting and presenting potential failures of transport links according to one aspect of the present disclosure.

FIG. 1 depicts an example of a DAS 100 suitable for implementing the subject matter described herein. As shown, DAS 100 can include a network of spatially separated remote units 102-112 connected to a common source (e.g., head-end unit 116) via a transport medium that provides wireless service within a geographic area or structure. DAS 100 can communicate signals between the base station 114 (or multiple base stations) and mobile communication devices (not shown) via, for example, head-end unit 116, one or more expansion units 118, and remote units 102-112 of the DAS 100.

The DAS 100 can include the head-end unit 116 for receiving uplink signals and downlink signals from the base station 114. Any suitable communication link can be used for communication between the base station 114 and the head-end unit 116. Examples of suitable communication links can include, for example, a connection via a copper, optical fiber, or other suitable communication medium. In some aspects, the head-end unit 116 can be connected to the remote units 102-112 via one or more expansion units 118 or other intermediate devices.

Each of the remote units 102-112 can provide signal coverage in a coverage zone by transmitting downlink signals to mobile communication devices in the coverage zone and receiving uplink signals from the mobile communication devices in the coverage zone. The remote units 102-112 can transmit uplink signals to the head-end unit 116 or another unit. The head-end unit 116 or the other unit can combine uplink signals received from the remote units 102-112 for transmission to the base station 114.

Head-end unit 116 in FIG. 1 can include a measurement module 122, a diagnostic module 124, and a presentation module 126. In some aspects, the modules 122, 124, 126 can be program code stored on a non-transitory computer-readable medium and executed using a processing device (or group of processing devices) in the head-end unit 116 or other device. The processing device can include or be communicatively coupled with a memory device. The memory device can include a non-transitory, computer-readable medium for storing program instructions that are executable by the processing device. Non-limiting examples of a processing device include a microprocessor, an application-specific integrated circuit ("ASIC"), a field-programmable gate array ("FPGA"), or other suitable processor. The executable program instructions can include modules 122-126. The modules 122-126 can be executed by the processing device to perform one or more operations for link quality measurement in the DAS 100.

For example, the measurement module 122 can be configured to perform one or more determinations of the quality or integrity of a digital transport system, such as the DAS 100. As described above, the measurement module 122 can perform a variety of measurements of link quality or integrity. Measurements can include comparing an attenuation of a signal sent over a cable with the length of the cable, comparing a transmitted power level with a received power level, measuring a DC resistance of a cable, comparing a current flow with an expected current flow, comparing a measured current draw to an expected current draw, measuring a roundtrip time of a reflected signal, determining a signal-to-noise ratio, or determining a resynchronization rate.

The diagnostic module 124 can be configured to determine whether a potential fault condition exists based on the one or more measurements before a failure occurs. For example, the diagnostic module 124 can determine that a potential fault condition likely exists when a measured signal to noise ratio is greater than a threshold value. A potential fault condition can be determined based on one, or multiple, link quality indicators. A potential fault condition can also be determined based on a history of link quality indicators.

The presentation module 126 can be configured to output audiovisual data for displaying the one or more measurements or fault conditions to a user via a graphical user interface (GUI). The presentation module 126 can generate GUIs for output to a display device coupled to the DAS. The presentation module 126 and modules 122, 124 can be located in a separate device (e.g., a computing device—not shown) coupled to the DAS 100.

Figure 2:
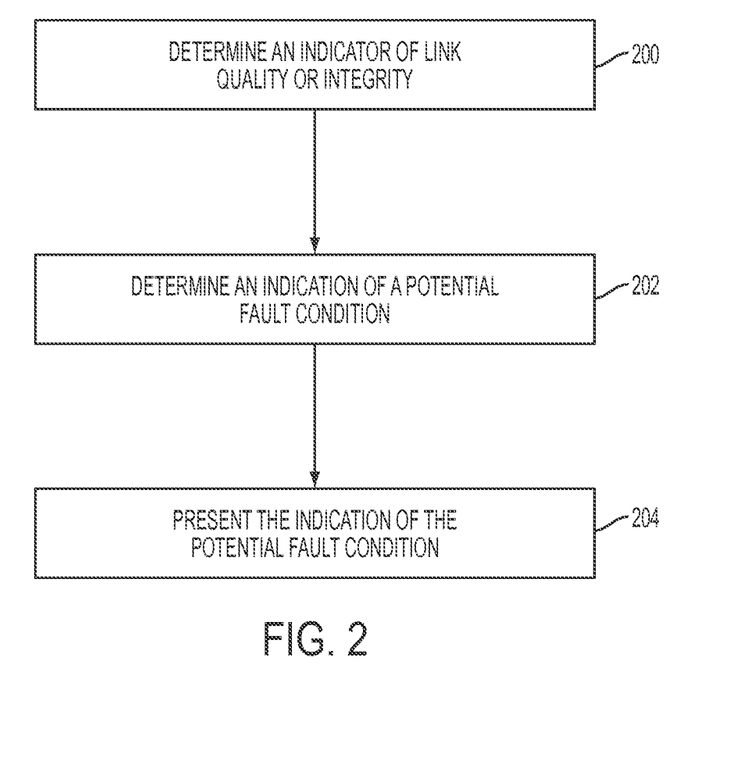
FIG. 2 is a flow chart of a process for detecting soft failures of transport links in a DAS according to one aspect of the present disclosure.

FIG. 2 is a flow chart of a process for detecting soft failures of a transport link in the DAS 100. At block 200, an indicator of the quality or integrity of a digital transport link in the DAS 100 can be determined by a component of the DAS 100. Determining link quality indicators can include measuring parameters associated with link quality, monitoring associated with link quality, or a combination thereof. Measuring parameters associated with link quality can include actively determining the parameter(s) by performing tests. Monitoring parameters associated with link quality can include collecting or otherwise determining parameters that are automatically generated by the DAS 100 during normal operation. There are many ways that the DAS 100 can be configured to measure the quality or integrity of a digital communications link to predict potential fault conditions.

One example of measuring the quality or integrity of a digital communications link includes performing a loopback test. Loopback can be implemented using hardware or software that feeds a received signal or data back to the sender. In a loopback test, data communication devices can be configured to send specific patterns (e.g., all "1's" for a digital signal) on an interface and can detect the reception of this signal on the same port. A loopback test can be performed within a transceiver by connecting the output of the transceiver to the input of the transceiver. A circuit between two points in different locations can be tested by applying a test signal on the circuit in one location, and having a network device at the other location send a signal back through the circuit. The network device receiving the network device signal back can indicate that the circuit is functioning properly. A hardware loop can include a device that physically connects the receive channel to the transmit channel. Media, such as optical fiber or coaxial cable, which can have separate transmit and receive connectors, can be looped together with a single strand of the appropriate medium. Thus, the length of a cable can be estimated by performing a loopback test.

Another method for determining the quality or integrity of a cable can include measuring a direct current (DC) resistance of the cable. A voltage drop from the source to the destination can be measured. The voltage drop can be compared with a measured current to determine the DC resistance of the cable. The expected resistance or length of the cable can be compared with an expected value to determine whether the cable is operating normally. Similar methods can be used to determine an attenuation, impedance, or length of an optical cable.

Another method for evaluating the quality or integrity of a cable can include determining near-end or far-end crosstalk when multi-conductor cable is used. Near-end crosstalk (NEXT) relates to a signal from one wire pair radiating and interfering with the signal of another wire pair. Near-end crosstalk can include a difference in amplitude (e.g., measured in dB) between a transmitted signal and the crosstalk received on other cable pairs at the same end of the cabling. Higher near-end crosstalk values can correspond to better cabling performance. A higher near-end crosstalk value can indicate that the power transmitted through the cable is greater than the power induced onto another wire pair. Near-end crosstalk can be measured from each wire pair to each other wire pair in a twisted pair cable and from each end of the cable. High near-end crosstalk values on a UTP network using certain signaling standards (e.g., IEEE 802.3i) can indicate a potential fault condition, such as an improper termination.

Twisted pair cabling (e.g., Ethernet cabling) is a type of wiring in which two conductors of a single circuit are twisted together for the purposes of canceling out electromagnetic interference from external sources. Unshielded twisted pair (UTP) cable is not surrounded by any shielding. Twisted pair cables can also be shielded to prevent electromagnetic interference. Shielding can be applied to individual pairs or to a collection of pairs. Individual pairs can be shielded using a metallic foil layer or the whole cable can be shielded using foil. Foiled twisted pair (FTP) can include foil shielding around the whole cable rather than around individual twisted pairs.

Determining near-end and far-end crosstalk can include determining a crosstalk value (e.g., dB) per unit of length of the cable. For example, near-end crosstalk can be measured at both ends of the cable. The near-end crosstalk value for a given cable type can be expressed in decibels per foot. Near-end crosstalk value can vary with the frequency of transmission. The higher the near-end crosstalk value, the greater the cable's ability to reject crosstalk at its local connection. Specifications for different cable types can include a minimum near-end crosstalk value.

Determining the quality or integrity of a cable can also include measuring the signal quality for different transport media to provide an indication of the media type. The difference between a Category 6a cable and a Category 5e cable can be identified based on link quality measurements. For example, Category 6a can exhibit less reduction of near-end crosstalk noise signal power at a given output power (e.g., 500 MHz) than a Category 5e cable.

Additionally, a Category 5e cable can pass all signal quality criteria, but not be the correct type recommended for use. Therefore, the cable can be determined to be a potential fault condition. Future system changes, such as moving a cable, can also result in a Category 5e cable changing from an acceptable quality to a failing quality. Determining a potential fault condition can, therefore, include not only determining existing quality, but also determining potential future quality issues. Determining potential future quality issues can include indicating, for example, that incorrect media is used.

Figure 3:
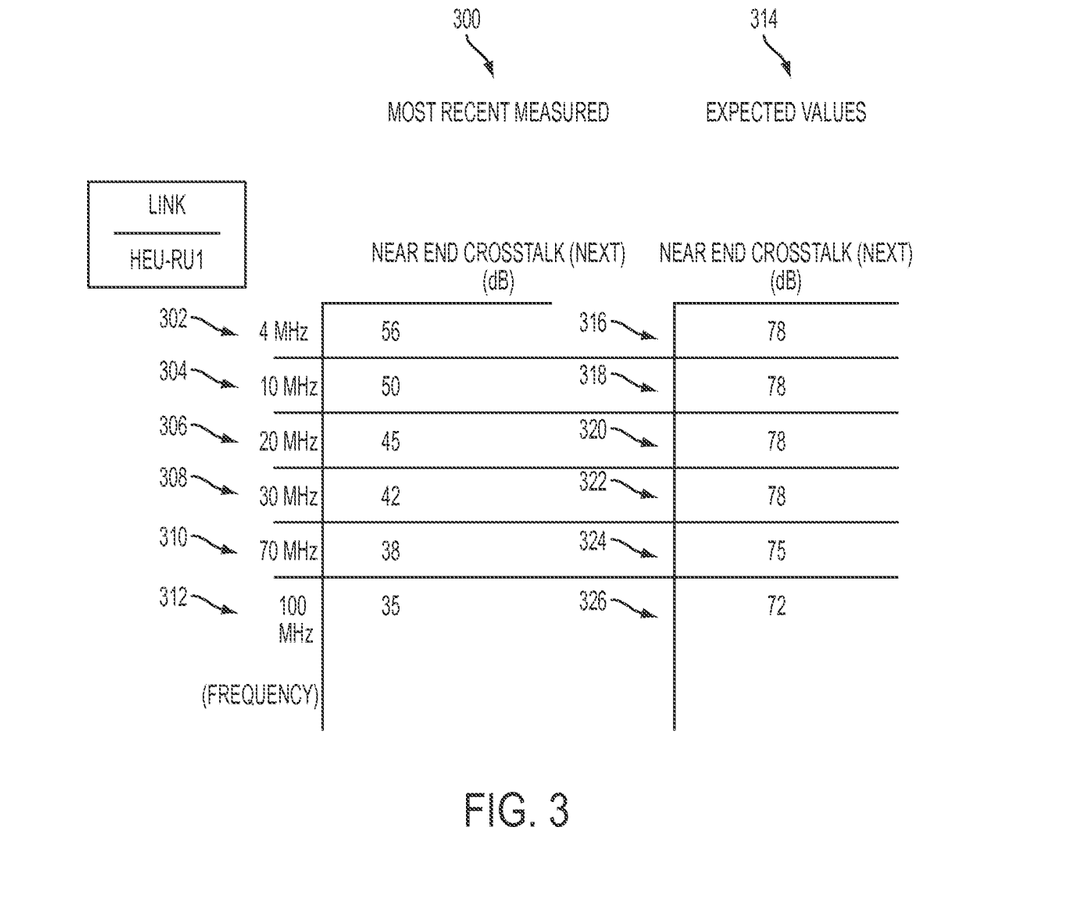
FIG. 3 is an example of a data structure for storing near-end crosstalk measurements and expected values for link quality measurements according to one aspect of the present disclosure.

An example of determining a link quality indicator for determining a potential fault condition based on incorrect media being used is shown in FIG. 3. FIG. 3 is an example of a data structure for storing near-end crosstalk measurements and expected values associated with link 128 according to one aspect of the present disclosure. In FIG. 3, near-end crosstalk can be measured at various frequencies for link 128 between head-end unit 116 and remote unit 102. Table 300 can include a most recent set of near-end crosstalk measurements. For example, link quality indicator 302 can indicate that near-end crosstalk is 56 dB at 4 MHz. Additional measurements 304, 306, 308, 310, and 312 can indicate that near-end crosstalk is 50 dB, 45 dB, 42 dB, 38 dB, and 35 dB at 10 MHz, 20 MHz, 30 MHz, 70 MHz, and 100 MHz, respectively.

Table 314 can include expected values for near-end crosstalk at various frequencies. The expected link quality indicator values in table 314 can be determined based on the specification for the type of cabling used or expected to be used. In the example shown in table 314, link 128 can be based on foiled twisted pair Ethernet cabling, which may be the appropriate type of cabling required for DAS 100. Specifications for foiled twisted pair Ethernet cabling can include expected link quality indicator values 316, 318, 320, and 322 associated with near-end crosstalk values of 78 dB at each of 4 Mhz, 10 MHz, 20 MHz, and 30 MHz. The specifications can further include an expected link quality indicator value 324 having a near-end crosstalk value of 75 dB at 70 Mhz and an expected link quality indicator value 326 having a near-end crosstalk value of 72 dB at 100 Mhz. Link quality indicators, such as those shown in table 300, and expected link quality indicator values, such as those shown in table 314, can be determined for each link 128-138 in the DAS 100. Additionally, the link quality indicator measurements can be determined over a period of time and stored.

Returning to the process shown in FIG. 2, in addition to measuring various parameters in the DAS as described above, the quality or integrity of a communications link can also be monitored to predict potential fault conditions in a DAS that uses digital transport of signals. Monitoring parameters associated with link quality can include collecting or otherwise determining parameters that are automatically generated by the DAS during normal operation. There are many ways the DAS can be configured to monitor the quality of a digital link.

According to one aspect, bit-error rate (BER) and frame error rate (FER) can be used for monitoring the quality and integrity of the digital transport system. Bit errors that can be tolerated in some data networks can severely degrade analog signals recreated from the digitized signals that are carried over the transport media. Degradation of analog signals can occur because the error correction and retransmission methods used to correct data errors may add latency when used in a digital DAS. Error detection coding can be used to detect the presence of errors in the receive signal. Error correction coding can be used to correct some bit errors. If there are too many bit errors in the signal, however, then an entire frame can be lost due to errors. The loss of a frame can also be detected and used to indicate the quality or integrity of a cable. The detected error rates can be measured over time and reported to a diagnostic module.

According to another aspect, resynchronization rates can be used for evaluating the quality or integrity of a cable. When too many errors occur in a period of time, a digital link can lose synchronization and go through a resynchronization process. The rate of resynchronization can be determined and reported to a diagnostic module.

Some transport methodologies, such as Ethernet over unshielded twisted pair (UTP), can use adaptive equalizers and cancellers to optimize performance. A monitoring system can monitor internal parameters of equalizers, cancellers, and other signal enhancement circuits to estimate the quality of the received signals. The parameters can be used to detect partially-impaired transmission lines.

Another method for evaluating the quality or integrity of a cable can include determining a signal-to-noise ratio (SNR) in the receiver. Determining the SNR for a cable can include determining a power level of a desired signal to a power level of background noise. Signal processing hardware or software located at the receiver can be configured to determine the receiver SNR. The receiver SNR can be used to detect quality or integrity of the transport media and any sources of interference.

Another component that can be monitored includes adaptive filters used to filter noise and interference or to determine the frequency or level of interference being filtered. This information can be used to detect sources and location of interference. According to one aspect, if several adjacent remote units detect interference and other remote units do not detect the same interference, then the location of the remote units can be used to locate the source of interference. For example, if remote units 104 and 106 detected interference while remote units 102 and 108 did not detect the same interference, then the source of the detected interference can be determined to be located between remote units 104 and 106.

At block 202, an indication of a potential fault condition can be determined. The indication of a potential fault condition can be determined based on the one or more indicators of link quality determined in block 200. The indicators can be used separately or in combination to determine a potential fault condition. A history of an indicator can be used to determine a potential fault condition. The potential fault condition can include a degradation of a parameter associated with link quality or integrity that is predictive of a potential failure of the link. Examples of methods for determining a potential fault condition based on one or more link quality indicators are described below.

In systems that use copper cable (e.g., twisted pair cable, coaxial cable), one method for determining a potential fault condition can include comparing the attenuation of the signals sent over the cable can with the length of the cable to determine whether the transport link is working and installed properly. As described above, attenuation can be measured by comparing a transmitted power level with a received power level. The expected attenuation per unit of length for the type of cable installed can be used to determine if the value is within an expected range. If the attenuation is too large for the measured length, a sub-optimal installation can be indicated.

Figure 4:
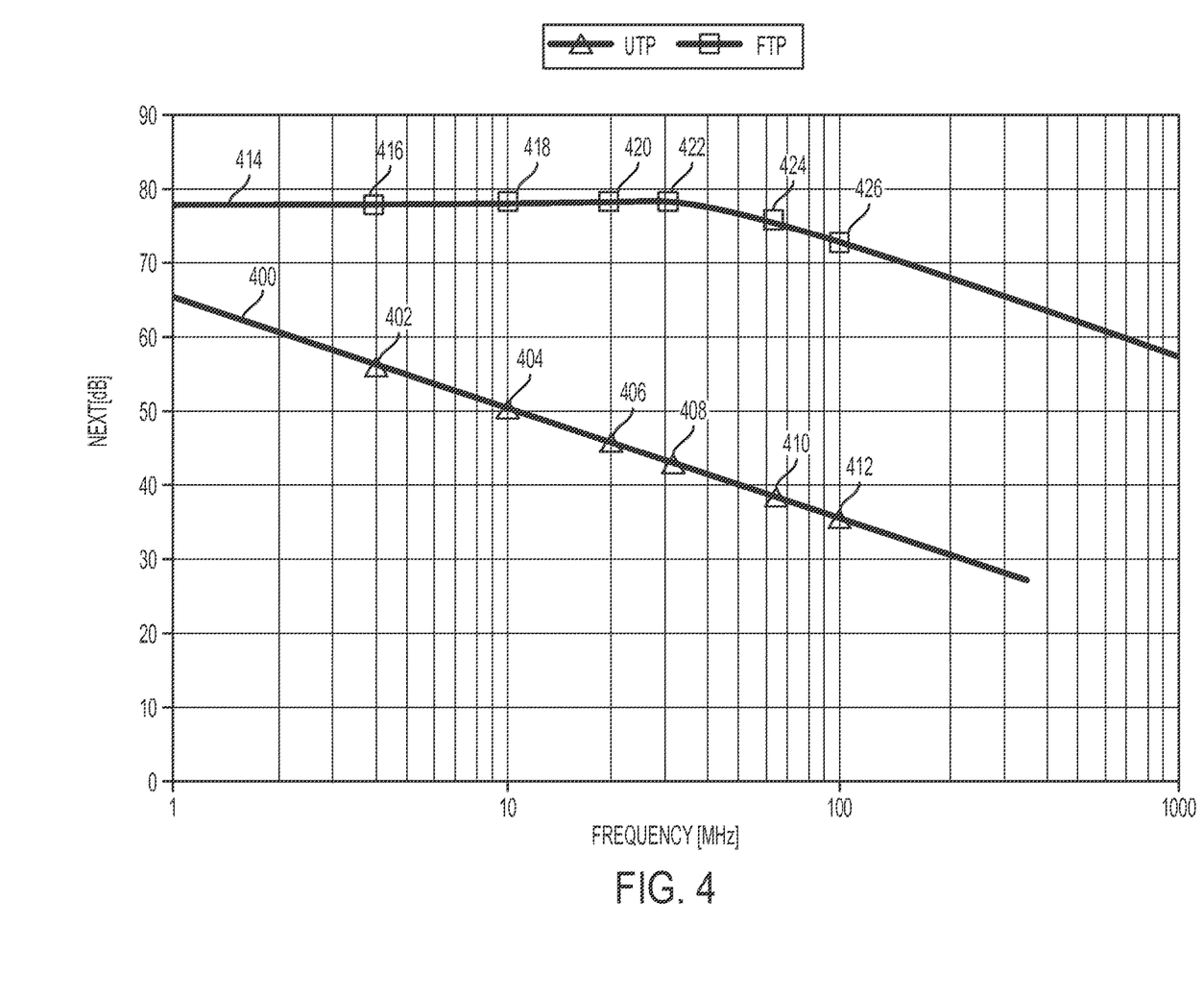
FIG. 4 is a two-dimensional line chart of near-end crosstalk measurements and expected values at various frequencies for determining a potential fault condition according to one aspect of the present disclosure.

One example of determining a potential fault condition is shown in FIG. 4. FIG. 4 includes an example of determining that a sub-optimal installation is indicated by comparing measured link quality indicators with expected link quality indicators. FIG. 4 is a two-dimensional line chart of near-end crosstalk measurements and expected values at various frequencies that can be used for determining a potential fault condition. The measured link quality indicators 302-312 and the expected link quality indicator values 316-326 can be plotted in FIG. 4. The measured link quality indicators 302-312 can be compared with the expected link quality indicator values 316-326 to determine whether the measured link quality indicators 302-312 match the expected link quality indicator values 316-326. As can be seen in FIG. 4, the expected link quality indicator values 316-326 associated with FTP cabling are different from the measured link quality indicators 302-312. The measured link quality indicators 302-312 can be indicative of UTP cabling. UTP cabling can be indicative of a potential fault condition if UTP cabling is not appropriate for the installation.

Returning to FIG. 2, another method for determining a potential fault condition can include using each link quality indicator in isolation to detect potential problems. Multiple indicators can also be used in combination to determine potential problems. According to one aspect, indicators determined separately or in combination can be used to infer what type of cable is used. For example, because Category 5e cable can have both higher attenuation and higher resistance than Category 6a cable, the combined indicators of the attenuation and resistance of the cable can be used to determine whether a cable is Category 5e or Category 6a.

Another method for determining a potential fault condition can include comparing the operation of multiple remote units to detect potential fault conditions. For example, in implementations having multiple remote units, an attenuation indicator can be compared across the remote units 102-112 in the DAS 100. Alternatively, remote units connected with similar lengths of cable can be compared. Outlier indicators can be flagged for further examination to determine if there are any fault conditions. Outlier detection can be used with any of the indicators or groups of indicators described herein.

Similarly, a history of indicators taken over a period of time for a remote unit or a link can be maintained. Using a past history of a link quality indicator, changes in performance or measured values can be used to detect potential problems. For example, when the DAS 100 is commissioned, a baseline set of indicators for all devices in the DAS 100 can be determined, stored and used periodically to determine whether any changes have occurred. Links 128-140 in the DAS 100 can be periodically monitored. If a potential fault condition is determined at a device or link, then that device or link can be monitored more frequently.

At block 204, the indication of a potential fault condition can be presented. The indication of a potential fault condition can be presented to a user using text, audio, visual representations, or a combination thereof. For example, the presentation can include a graphical user interface, a table, an email alert, or a text message. In one embodiment, a graphical user interface for presenting the potential fault condition can include displaying a network diagram. The network diagram can depict a DAS including various components and communications links in the DAS, indicators of link quality, and any potential fault conditions. The network diagram can include one or more selectable data filters for selecting attributes of the digital transport links and components in the DAS, where the presentation of the digital transport links and components are based on the selected attributes. According to another aspect, an alarm can be generated and presented to the user if a potential fault condition exists or other configurable alarm condition is satisfied.

The information determined in blocks 200 and 202 can be presented in a variety of ways. In one example, devices in the DAS 100 and corresponding indicators can be stored in a table and displayed to a user. The results can be color coded or otherwise distinguished to make detection of abnormal conditions easy to visually detect.

Figure 5:
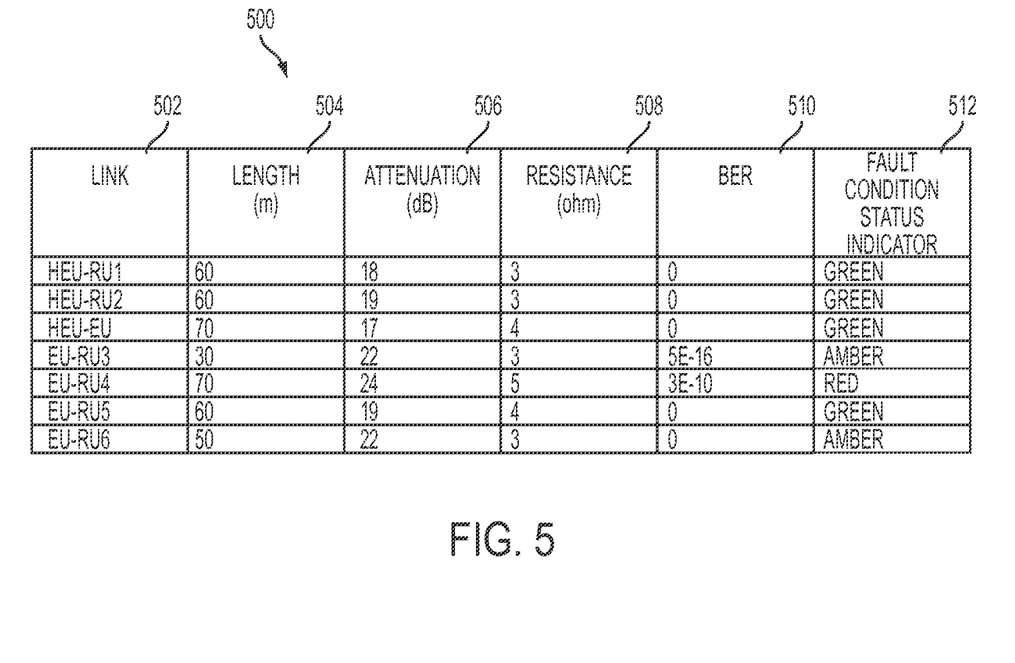
FIG. 5 is a table showing examples of link quality measurements and associated fault condition status indicators according to one aspect of the present disclosure.

FIG. 5 is an example of a format for presenting link quality measurements and associated fault condition status indicators according to one aspect of the present disclosure. FIG. 5 includes a table of examples of measurements and fault condition status indicators determined based on the measurements. For example, the length of the communications link between the head-end unit 116 and remote unit 102 (shown as HEU-RU1) in FIG. 5 is determined to be 60 meters. Similarly, the attenuation, resistance, and bit-error rate of the link is determined to be 18 dB, 3 ohms, and 0, respectively. The diagnostic module 124, which can be located at the head-end unit 116 or another suitable location within the DAS 100, can use the measurements in FIG. 5 to determine that the HEU-RU1 link 128 is operating normally and that no potential fault condition exists. If no potential fault condition exists, the fault condition status indicator can be green.

In contrast to the green link above, the link 136 between the expansion unit 118 and the remote unit 108 (shown as EU-RU4), is determined by the diagnostic module 124 to have a red fault condition status indicator that indicates that a fault condition is present on the link 136. As shown in FIG. 5, measurements performed on the EU-RU4 link 136 indicates a length of 70 meters, an attenuation of 24 dB, a resistance of 5 ohms, and a bit error rate of 3E-10. These measurements can be compared, for example, with baseline values to determine whether one or more measurements are outside of normal ranges.

Another method for presenting link quality indicators and potential fault conditions includes displaying a graphical user interface-based network diagram. Examples of network diagrams suitable for presenting potential fault conditions in a DAS are shown in FIGS. 6 and 7.

Figure 6:
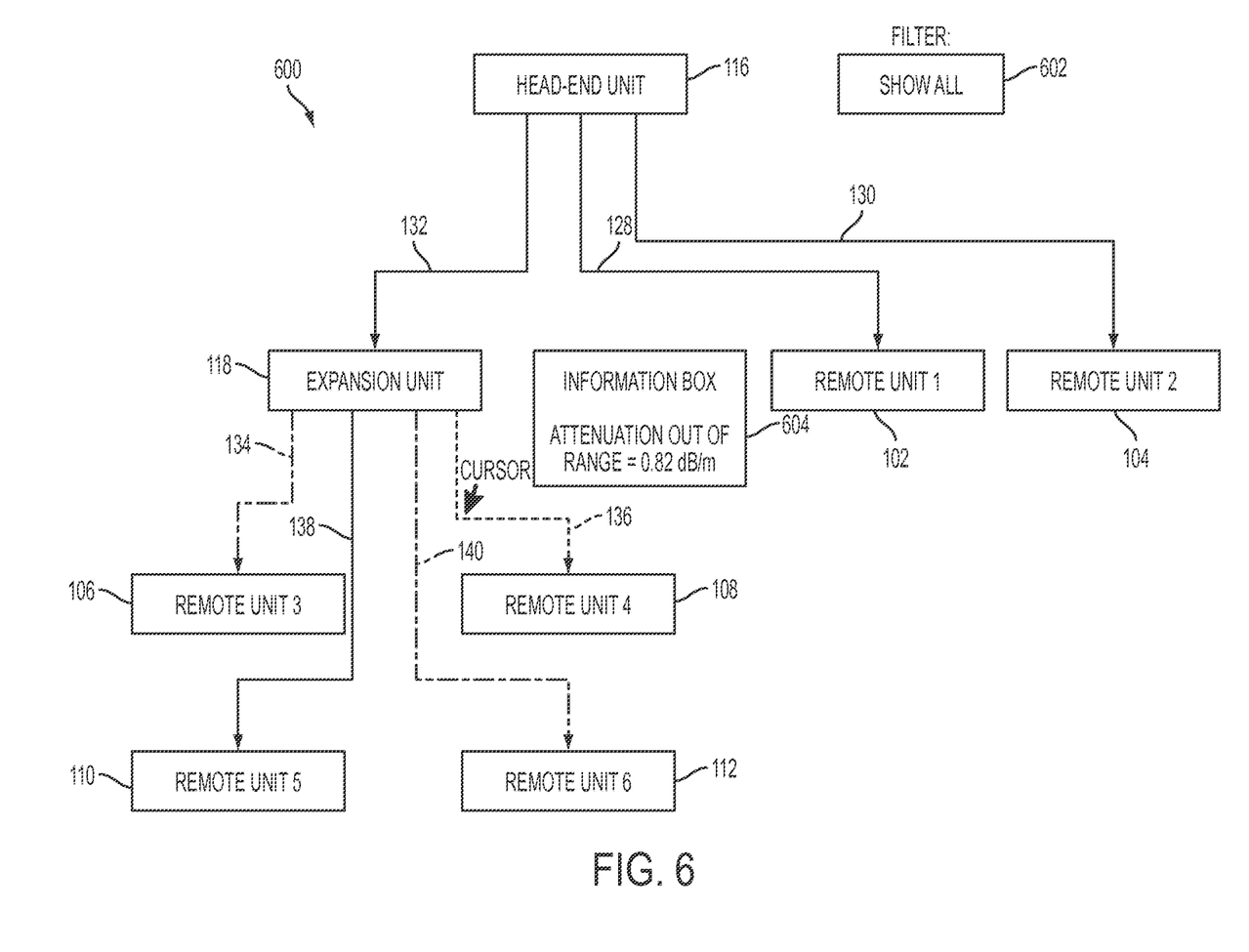
FIG. 6 is a network diagram of a DAS for graphically presenting one or more indicators of link quality or indications of potential fault conditions according to one aspect of the present disclosure.
Figure 7:
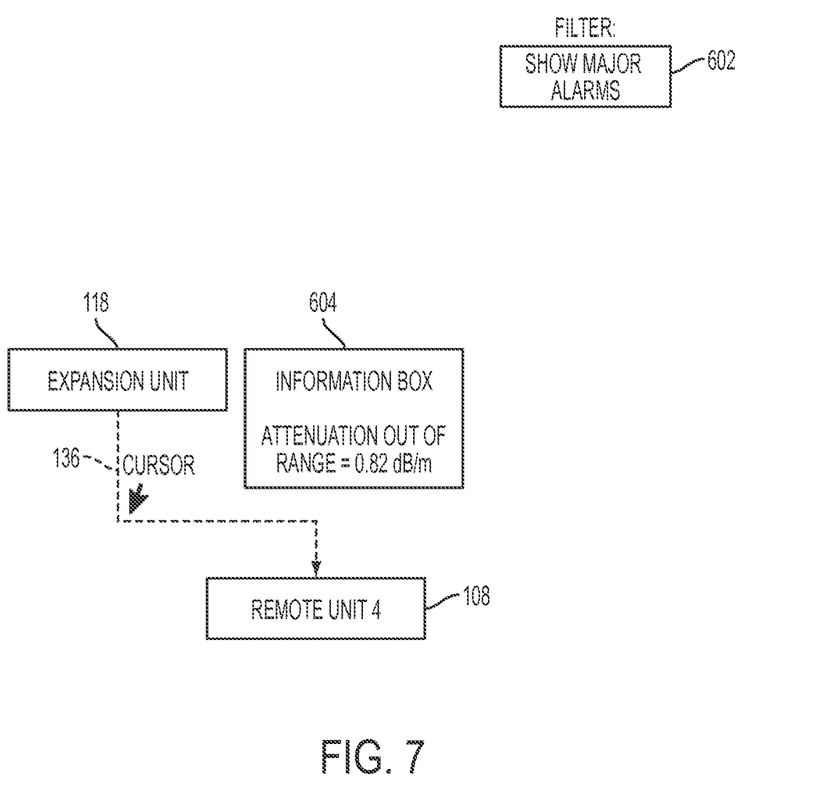
FIG. 7 is a network diagram of a DAS for graphically presenting one or more indicators of link quality or indications of potential fault conditions according to one aspect of the present disclosure.

FIG. 6 is a network diagram of a DAS for graphically presenting one or more indicators of link quality or indications of potential fault conditions according to an aspect of the present disclosure. In FIG. 6, graphical user interface 600 can include a network diagram showing an unfiltered representation of visual impairments in the DAS 100. For example, selectable data filter 602 can be set to "Show All" indicators of link quality and indications of potential fault conditions in the DAS.

Head-end unit 116 can be connected (e.g., communicatively coupled) to remote units 102, 104 and expansion unit 118 via digital communications links 128, 130, and 132, respectively. Similarly, expansion unit 118 can be connected to remote units 106, 108, 110, and 112 via communications links 134, 136, 138, and 140, respectively.

The lines representing the communications links 128-140 can be displayed using, for example, different colors to differentiate links based on indicators of link quality or indications of potential failure associated with each link. In one embodiment, different colors can be used to indicate the severity of a detected problem. In FIG. 6, dashed lines are used to represent different link conditions. For example, links 128-132 can be displayed in green or using a solid line to show that the links 128-132 are operating normally. Links 134 and 140, however, can be displayed in amber or using a lightly dashed line to show that the links 134 and 140 are impaired. Finally, link 136 can be displayed in red or using a heavily dashed line to show that the link 136 is associated with a potential fault condition.

Placing a mouse cursor over or otherwise selecting a particular communications link can cause more detailed information to be displayed. For example, information box 604 can be displayed when the link 136 is selected. Information box 604 can present the indicator(s) of link quality and the criteria used for determining the presentation status of the link (e.g., whether a potential fault condition exists). As shown, information box 604 indicates that the attenuation determined for link 136 is 0.82 dB/m, which can indicate a potential fault condition.

According to another aspect, an alarm notification can be sent via email, simple network management protocol (SNMP), text message or other messaging service. The alarm can include a text-based alarm which is transmitted to the user without requiring that the user observe a table or network diagram. The alarm can also include an audio alarm to alert the user of a potential fault condition.

FIG. 7 is a network diagram of a DAS for graphically presenting one or more indicators of link quality or indications of potential fault conditions where a subset of indicators are displayed based on a selected data filter according to an aspect of the present disclosure. The network shown in FIG. 7 can include the same network as the network shown in FIG. 6, but with components or links not associated with a potential fault condition filtered out. As a result, a user can quickly determine which components in the DAS may require corrective action to prevent a failure. A user can select data filters 602 to display communications links and devices having certain attributes. For example, the data filter 602 can be configured to display DAS components or links associated with an alarm condition or which have a particular parameter that is above a threshold level.

In FIG. 7, only expansion unit 118, remote unit 108, and link 136 are shown as DAS components because other DAS components have been filtered out by filter 602. Selectable data filter 602 in FIG. 7 is configured to display DAS components associated with major alarms. Expansion unit 118, remote unit 108, and link 136 are associated with a major alarm, as indicated by the dashed line in FIG. 7.

Information box 604 can be displayed when link 136 is selected. Information box 604 can present the indicator(s) of link quality and the criteria used for determining the presentation status of the link (e.g., whether a potential fault condition exists). As shown, information box 604 indicates that the attenuation determined for link 136 is 0.82 dB/m, which is outside of an acceptable operating range.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:

1. A method comprising: determining, by a component of a distributed antenna system, a link quality indicator associated with an aspect of performance of a digital transport link in the distributed antenna system over time, wherein the digital transport link is a cable coupled between components of the distributed antenna system; determining an indication of a potential fault condition of the digital transport link based on a history of the link quality indicator determined over time and before a fault condition of the digital transport link associated with the potential fault condition of the digital transport link occurs, wherein the potential fault condition of the digital transport link comprises a degradation of operation of the digital transport link to outside a normal operating range of the digital transport link, wherein the normal operating range of the digital transport link comprises a range of parameters in which the digital transport link is functioning at its full performance; and communicating the indication of the potential fault condition of the digital transport link to a user device to be displayed for a user, wherein the user device is separate from the distributed antenna system, wherein the user device is communicatively coupled to the distributed antenna system.

2. The method of claim 1, wherein determining the link quality indicator includes monitoring at least one of a signal-to-noise ratio, a resynchronization rate, a bit-error rate, or an interference associated with the digital transport link.

3. The method of claim 1, wherein determining the link quality indicator includes measuring at least one of a direct current resistance, a roundtrip time of a reflected signal, a current flow, an attenuation, an impedance, or a resistance of the digital transport link.

4. The method of claim 1, wherein determining the indication of the potential fault condition of the digital transport link includes at least one of:
- comparing an attenuation of a signal transmitted over a cable to a length of the cable,
- comparing a transmitted power level to a received power level, or
- comparing a measured current flow to an expected current flow.

5. The method of claim 1, wherein determining the indication of the potential fault condition of the digital transport link includes using two or more different link quality indicators in combination, wherein the cable is one of an optical cable or a copper cable.

6. The method of claim 1, further comprising presenting the indication of the potential fault condition of the digital transport link via at least one of a graphical user interface, a table, an email alert, or a text message.

7. The method of claim 6, wherein presenting the indication of the potential fault condition of the digital transport link is by the graphical user interface, wherein the graphical user interface includes a network diagram depicting the distributed antenna system and one or more selectable data filters for selecting an attribute of the digital transport link in the distributed antenna system, wherein presentation of the digital transport link is based on the attribute.

8. A system comprising: a measurement module configured to determine a link quality indicator associated with an aspect of performance of a digital transport link in a distributed antenna system over time, wherein the digital transport link is a cable coupled between components of the distributed antenna system; a diagnostic module configured to determine an indication of a potential fault condition of the digital transport link based on a history of the link quality indicator determined over time and before a fault condition of the digital transport link associated with the potential fault condition of the digital transport link occurs, wherein the potential fault condition of the digital transport link comprises a degradation of operation of the digital transport link to outside a normal operating range of the digital transport link, wherein the normal operating range of the digital transport link comprises a range of parameters in which the digital transport link is functioning at its full performance; and a presentation module configured to output the indication of the potential fault condition of the digital transport link to a user device to be displayed for a user, wherein the user device is separate from the distributed antenna system, wherein the user device in communicatively coupled to the distributed antenna system.

9. The system of claim 8, wherein the measurement module and the diagnostic module are components of a head-end unit of the distributed antenna system.

10. The system of claim 8, wherein the measurement module is configured to determine a near-end crosstalk value for one or more frequencies.

11. The system of claim 10, wherein the measurement module is configured to determine an expected near-end crosstalk value for each of the one or more frequencies.

12. The system of claim 11, wherein the diagnostic module is configured to determine the indication of the potential fault condition of the digital transport link by determining that a cable type of the digital transport link is different than an intended cable type based on comparing a measured near-end crosstalk value at each of the one or more frequencies to expected near-end crosstalk values at each of the one or more frequencies.

13. The system of claim 8, wherein the presentation module is further configured to present the indication of the potential fault condition of the digital transport link via at least one of a graphical user interface, a table, an email alert, or a text message.

14. The system of claim 8, wherein the presentation module is further configured to present one or more selectable data filters for selecting an attribute of the digital transport link, and a network diagram depicting the distributed antenna system where the digital transport link is presented based on the attribute.

15. The system of claim 8, wherein the diagnostic module is configured to determine the indication of the potential fault condition of the digital transport link based on a difference between the link quality indicator measured at a first time and the link quality indicator measured at a second time, wherein the cable is one of an optical cable and a copper cable.

16. A system comprising:
- a measurement module configured to measure a parameter associated with a component of a distributed antenna system over time;
- a diagnostic module configured to determine an indication of a potential fault condition of a digital transport link before a fault condition of the digital transport link associated with the potential fault condition of the digital transport link occurs by comparing a history of the parameter determined over time with expected values of the parameter, wherein the potential fault condition of the digital transport link comprises a degradation of operation of the digital transport link to outside a normal operating range of the digital transport link, wherein the normal operating range of the digital transport link comprises a range of parameters in which the digital transport link is functioning at its full performance, wherein the digital transport link is a cable coupled between components of the distributed antenna system; and
- a presentation module configured to provide the indication of a potential fault condition of the digital transport link to a user via a graphical user interface.

17. The system of claim 16, wherein the presentation module is further configured to present (i) one or more selectable data filters for selecting an attribute of a digital transport link, and (ii) a network diagram depicting the distributed antenna system based on the attribute.

18. The system of claim 16, wherein the diagnostic module is configured to:
- measure a first value of the parameter at a first time;
- measure a second value of the parameter at a second time;
- determine a first expected value of the parameter;
- determine a second expected value of the parameter;
- compare the first value of the parameter to the first expected value of the parameter to generate a first comparison;
- compare the second value of the parameter to the second expected value of the parameter to generate a second comparison;
- determine a rate of change between the first comparison and the second comparison over a period of time between the first time and the second time; and
- compare the rate of change to a threshold rate of change to determine the indication of the potential fault condition of the digital transport link.

19. The system of claim 16, wherein the measurement module is configured to determine a location of an interference source based on one or more interference link quality indicators, wherein the cable is one of an optical cable and a copper cable.

20. The system of claim 16, wherein the diagnostic module is configured to predict a likelihood that the fault condition will occur before the fault condition occurs based on the indication of the potential fault condition of the digital transport link.

* * * * *